United States Patent [19]

Mielke et al.

[11] Patent Number: 5,656,195
[45] Date of Patent: Aug. 12, 1997

[54] MOLDINGS CONTAINING SILICA AEROGEL PARTICLES AND THEIR PREPARATION

[75] Inventors: Manfred Mielke, Heidelberg; Karl-Heinz von Dungen, Bürstadt, both of Germany

[73] Assignee: BASF Aktiengesellschaft, Ludwigshafen, Germany

[21] Appl. No.: 405,945

[22] Filed: Mar. 17, 1995

[30] Foreign Application Priority Data

Mar. 18, 1994 [DE] Germany ............... 44 09 309.8

[51] Int. Cl.$^6$ ........................... E04B 1/74
[52] U.S. Cl. ............ 252/62; 252/315.6; 106/38.3; 106/38.35; 106/600
[58] Field of Search ............... 252/62, 315.01, 252/315.2, 315.6; 106/38.2, 38.27, 38.3, 38.35, 600, 603; 423/338

[56] References Cited

U.S. PATENT DOCUMENTS

| | | | |
|---|---|---|---|
| 2,093,454 | 10/1937 | Kistler. | |
| 3,872,217 | 3/1975 | Merz et al. | 423/338 |
| 3,977,993 | 8/1976 | Lynch | 252/317 |
| 4,529,532 | 7/1985 | Gliem et al. | 252/62 |
| 4,954,327 | 9/1990 | Blount | 423/338 |
| 5,124,364 | 6/1992 | Wolff et al. | 521/55 |
| 5,294,480 | 3/1994 | Mielke et al. | 428/240 |

FOREIGN PATENT DOCUMENTS

| | | |
|---|---|---|
| A-2103243 | 8/1972 | Denmark. |
| 0 130 629 | 1/1985 | European Pat. Off.. |
| A-0 340 707 | 4/1989 | European Pat. Off.. |
| 0 489 319 | 6/1992 | European Pat. Off.. |

OTHER PUBLICATIONS

Chemical Abstracts, vol. 102, No. 12, Mar. 18, 1985, AN–99952w, JP–59–199567, Nov. 12, 1984.

*Primary Examiner*—Paul Marcantoni
*Attorney, Agent, or Firm*—Oblon, Spivak, McClelland, Maier & Neustadt, P.C.

[57] ABSTRACT

In moldings which have a density of from 0.1 to 0.4 g/cm$^3$ and contain silica aerogel particles which have a mean diameter $d_m$ of from 0.001 to 8 mm and are bonded to one another by means of at least one organic or inorganic binder, the binder contains sheet silicates and/or clay minerals.

14 Claims, No Drawings

MOLDINGS CONTAINING SILICA AEROGEL PARTICLES AND THEIR PREPARATION

The present invention relates to moldings which contain silica aerogel particles and a process for their preparation. The present invention relates in particular to moldings which contain at least one organic or inorganic binder.

EP-A-0 340 707 discloses insulating materials which have a density of from 0.1 to 0.4 g/cm$^3$, good heat insulation properties and sufficiently high compressive strength and which are obtained by adhesively bonding silica aerogel particles with an inorganic or organic binder. Examples of suitable inorganic binders are cement, gypsum, lime and/or waterglass.

However, it is frequently necessary to use high binder contents for the preparation of such moldings. Moreover, many performance characteristics, for example thermal conductivity or breaking strength, are still unsatisfactory; Problems also frequently arise in the production of the moldings. Many organic binders have a high viscosity and therefore cannot be used. The use of low-viscosity dispersions frequently requires excessively great dilution with aqueous solvents, which has the disadvantage that the binder present in the dispersions does not wet the aerogel surface and therefore does not bond with the silica aerogel particles, which are generally hydrophobic.

It is an object of the present invention to provide moldings which can have improved thermal conductivity and a low density in combination with a relatively low binder content. The moldings should moreover be capable of being prepared in a simple manner, for example by the improved use of organic binders.

We have found that this object is achieved by moldings which have a density from 0.1 to 0.4 g/cm$^3$ and contain silica aerogel particles which have a mean diameter $d_m$ of from 0.001 to 8 mm and are bonded to one another by means of at least one organic or inorganic binder, the binder containing sheet silicates and/or clay minerals.

The present invention furthermore relates to a process for the preparation of these moldings, wherein silica aerogel particles having a mean diameter $d_m$ of from 0.001 to 8 mm are coated and/or mixed with an aqueous suspension which contains sheet silicates and/or clay minerals and at least one inorganic or organic binder, and the material is cured in a mold.

The novel moldings contain silica aerogel particles having a mean diameter $d_m$ of from 0.001 to 8 mm, the moldings preferably containing at least 50% by volume of silica aerogel particles having a diameter d of from 0.5 to 8 mm. In a preferred embodiment of the invention, the moldings contain from 2 to 50, preferably from 3 to 30, particularly preferably from 5 to 15, % by weight, based on silica aerogel particles having a mean diameter $d_m$ of from 0.001 to 8 mm, of silica aerogel particles having a diameter d of from 0.001 to 0.5 mm.

The silica aerogel particles having a diameter d of from 0.5 to 8, preferably from 1 to 5, particularly preferably from 2 to 4, mm are, as a rule, bead-like or spherical and generally have a density of from 80 to 300, preferably from 80 to 250, particularly preferably from 80 to 150, g/l. According to the invention, the densities are bulk densities.

The silica aerogel particles having a diameter d of from 0.001 to 0.5 mm preferably have a diameter of from 0.02 to 0.3, particularly preferably from 0.05 to 0.15, mm.

The novel moldings preferably contain either no silica aerogel particles having a diameter d of from 0.001 to 0.5 mm and only silica aerogel particles having a diameter of from 0.5 to 8 mm or mixtures of these particles in which the particles can be divided into at least two, preferably two, fractions delimited with respect to one another, as a function of their diameter. Mixtures of silica aerogel particles having a diameter d of from 1 to 5 mm with those having a diameter of from 0.02 to 0.3 mm are preferably used here.

The novel moldings contain, as an essential component, sheet silicates and/or clay minerals. Montmorillonites (e.g. bentonites), kaolinites and/or attapulgites are preferably used, among which in turn the montmorillonites are particularly preferably used.

The desired heat resistance of the molding may furthermore give rise to the preference of a specific sheet silicate and/or clay mineral.

The novel moldings contain sheet silicates and/or clay minerals preferably in an amount of from 0.5 to 10, particularly preferably from 0.5 to 5, % by weight, based on the silica aerogel particles having a mean diameter $d_m$ of from 0.001 to 8 mm.

When relatively finely divided silica aerogel particles are used, for example those having a diameter d of from 0.001 to 0.5 mm, it is advisable in general to choose the amount of sheet silicates and/or clay minerals to be slightly higher.

The silica aerogel particles having a mean diameter $d_m$ of from 0.001 to 8 mm generally consist of amorphous silica and, depending on the method of their preparation, may also contain traces of water and, if required, small amounts of organic compounds (up to 10% by weight).

The silica aerogel particles having a diameter d of from 0.5 to 8 mm can be prepared in a known manner from waterglass solution via the stages silica hydrogel, solvent exchange and subsequent supercritical drying. The bead shape generally present arises here as a result of atomizing a rapidly gelling silica sol from a specially designed nozzle and gelling the drops in flight. Further details are described in DE-A-21 03 243. The exchange of hydrogel water for other liquids chemically inert to silica is described, for example, in U.S. Pat. No. 2,093,454, U.S. Pat. No. 3,977, 993 and JP-A-53/025 295.

The silica aerogel particles used according to the invention having a diameter d of from 0.001 to 0.5 are generally prepared by milling the silica aerogel particles having a diameter d of from 0.5 to 8 mm in a manner known per se.

According to the invention, silica aerogel particles rendered hydrophobic are particularly preferably used.

Dry methanol or isopropanol are therefore advantageously used as gel liquids for supercritical drying, so that the resulting aerogels are hydrophobic, the resulting carbon contents generally being from 5 to 8% by weight. A particularly suitable process is described in German Patent Application P 43 29 294.1.

In a preferred embodiment, the silica aerogel particles used in the novel moldings contain opacifiers, as described, for example, in EP-B-0 396 076. These opacifiers are preferably pigments which scatter, absorb or reflect infrared radiation of wavelength 3–10 μm. Preferably, a pigment black can be very homogeneously incorporated in the silica aerogels at as early a stage as the intermediate, i.e. the hydrogel (cf. EP-B-0 396 076). Further opacifiers suitable according to the invention are, for example, ilmenite, haematite or mixed oxides (spinels).

Also very suitable are opacified silica aerogels which contain carbon particles and are obtainable by heating a) organically modified SiO$_2$ aerogels in the presence of at least one pyrolizable hydrocarbon gas and/or at least one inert gas, or b) organically unmodified $SiO_2$ aerogels in the presence of at least one pyrolizable hydrocarbon gas and, if required, an inert gas under the conditions stated in European Patent Application No. 93 120 858.1.

In a particularly preferred embodiment of the invention, the moldings contain organic binders.

Examples of suitable organic binders are reaction adhesives, such as epoxy resin adhesives, reactive polyurethane adhesives, phenol/formaldehyde, resorcinol/formaldehyde, urea/formaldehyde and melamine/formaldehyde resins, silicone resin adhesives, polyimide and polybenzimidazole resins, hotmelt adhesives, such as ethylene/vinyl acetate copolymers and polyamides, and aqueous dispersion adhesives, such as styrene/butadiene and styrene/acrylate copolymers.

Among these, aqueous dispersion adhesives, such as styrene/butadiene and styrene/acrylate copolymers, and polyurethane dispersions are particularly suitable.

According to the invention, the organic binder can be used in a relatively small amount, in general in an amount of 3 to 30% by weight, based on the molding.

The amount used depends on the type of organic binder and may also be higher for certain binders.

If, for example, silicone resin adhesives are used, the amount of organic binder may be up to 60% by weight, based on the molding.

The use of inorganic binders is advantageous for the production of shaped articles having higher heat resistance. In addition to the inorganic binders stated in EP-A-0 340 707, heat-resistant or ceramic fiber materials based on aluminum silicates are particularly advantageous. Examples of these are the fiber-containing binders of the type Hesiflex® from Albert Hellhake GmbH & Co, Dortmund. For example, the inorganic binders of the type Fiberfrax® Fraxbond from Carborundum are also useful.

The novel moldings are preferably prepared by coating and/or mixing silica aerogel particles having a mean diameter $d_m$ of from 0.001 to 8 mm with an aqueous suspension which contains sheet silicates and/or clay minerals and at least one organic or inorganic binder, and curing the material in a mold.

In a preferred embodiment of the novel process, the inner surfaces of the mold are rendered moisture-permeable and hydrophobic.

This can be done, for example, by placing metal sieves and suitable polymer films, one on top of the other.

Silica aerogel particles having a diameter d of from 0.5 to 8, preferably from 1 to 5, mm and those having a diameter d of from 0.001 to 0.5, preferably from 0.02 to 0.3, mm are preferably used in the novel process. The clay minerals and/or sheet silicates are preferably first mixed with the silica aerogel particles having a diameter d of from 0.001 to 0.5 mm, and silica aerogel particles having a diameter d of from 0.5 to 8 mm are then added to this mixture.

In the novel process, the clay minerals and/or sheet silicates are generally used in liquid form, in particular as an aqueous dispersion or suspension.

The freshly prepared mixture of clay minerals and/or sheet silicates with water is generally left to stand for several hours in order to swell and to establish the viscosity, and the inorganic and/or organic binders are then added. As a rule, the silica aerogel particles are mixed in only thereafter.

Owing to their excellent mechanical properties (for example high breaking strength) and heat insulation properties (thermal conductivities of less than 0.025 W/mK can generally be achieved), the novel moldings can be used in a very wide range of areas.

Examples of these are the heat insulation of buildings, boilers, cooling units, ovens (cf. EP-A-0 475 285), heating pipes, district heating pipes, liquefied gas containers, night storage heaters and vacuum insulations of technical equipment of various types.

A further advantage of the novel moldings is that their surface is homogeneous and smooth. The moldings can moreover be processed in a particularly simple manner by sawing, grinding or cutting. Individual aerogel particles do not fall out during this procedure, so that the processed surfaces, too, appear homogeneous.

EXAMPLES

In the examples, the thermal conductivity of the moldings was measured by means of the Lambda-Control A 50 apparatus from Hesto. The differences found here were only very small (less than 1 mW/mK) compared with the thermal conductivities measured according to DIN 52616. The binder content stated in the examples is the difference between the weight of the molding and the weight of the silica aerogel particles.

Example 1

80 g of a 1% strength by weight aqueous suspension of magnesium montmorillonite (Bentone® LT; registered trademark of National Lead) were added,-while stirring, to 120 g of an aqueous polymer emulsion based on thermoplastic styrene/butyl acrylate copolymers having a polymer content of 50% by weight (Acronal® 290 D from BASF Aktiengesellschaft). 176 g of silica aerogel beads which had been rendered hydrophobic and had a mean diameter of 3 mm and a bulk density of 120 g/l were stirred with this mixture. The readily brushable mixture was introduced into a rectangular mold which had a base area of 20×20 cm and was bordered at both end faces by filter and sieve sheets placed one on top of the other. The upper end face was loaded with 13 kg, and the material pressed in this manner was dried for 12 hours at 80° C. in a drying oven. A stable molding having a density of 188 kg/m³, a binder content of 26% by weight and a thermal conductivity of 0.018 W/mK at 23° C. was obtained.

Example 2

90 g of a 1% strength by weight aqueous suspension of magnesium montmorillonite (Bentone® LT) Were added, while stirring, to 25 g of an aqueous polymer emulsion based on thermoplastic styrene/butyl acrylate copolymers having a polymer content of 50% by weight (Acronal® 290 D from BASF Aktiengesellschaft). 7 g of a powder of hydrophobic silica aerogel having a mean diameter of 0.12 mm were then introduced. Thereafter, 37 g of silica aerogel beads which had been rendered hydrophobic and had a mean diameter of 3 mm and a bulk density of 120 g/l were added to this mixture and thoroughly mixed. The readily brushable mixture was introduced into a circular mold which had a diameter of 10 cm and was bordered at both end faces by filter and sieve sheets placed one on top of the other. The upper end face was loaded with 2.5 kg, and the material pressed in this manner was predried for 20 hours at 50° C. in a drying oven and additionally dried for 3 hours at 100° C. A stable molding having a density of 180 kg/m³, a binder content of 23% by weight and a thermal conductivity of 0.017 W/mK at 23° C. was obtained.

Example 3

47 g of a 1% strength by weight aqueous suspension of magnesium montmorillonite (Bentone® LT) were added, while stirring, to 25 g of an aqueous polymer emulsion based on thermoplastic styrene/butyl acrylate copolymers having a polymer content of 50% by weight (Acronal® 290 D from BASF Aktiengesellschaft). 13 g of a powder of hydrophobic silica aerogel having a mean diameter of 0.12 mm were then introduced. Thereafter, 31 g of silica aerogel beads which had been rendered hydrophobic and had a mean diameter of 3 mm and a bulk density of 120 g/l were added to this mixture and thoroughly mixed. The readily brushable mixture was introduced into a circular mold having a diameter of 10 cm and bordered at both end faces by filter and sieve sheets placed one on top of the other. The upper end face was loaded with 2.5 kg, and the material pressed in this manner was predried for 12 hours at 90° C. in a drying oven and additionally dried for 2 hours at 130° C. A stable molding having a density of 182 kg/m$^3$, a binder content of 23% by weight and a thermal conductivity of 0.017 W/mK at 23° C. was obtained.

Example 4

10 g of a 1% strength by weight aqueous suspension of magnesium montmorillonite (Bentone® LT) were added, while stirring, to 44 g of an aqueous polyurethane emulsion having a polymer content of 27% by weight (Paradur® ZK 42 6486 from BASF Lacke und Farben AG). Thereafter, 44 g of silica aerogel beads which had been rendered hydrophobic and had a mean diameter of 3 mm and a bulk density of 120 g/l were added to this mixture and thoroughly mixed. The free-flowing and readily brushable mixture was introduced into a circular mold having a diameter of 10 cm and bordered at both end faces by filter and sieve sheets placed one on top of the other. The upper end face was loaded with 2.5 kg, and the material pressed in this manner was predried for 6 hours at 90° C. in a drying oven and additionally dried for 2 hours at 130° C. A stable molding having a density of 160 kg/m$^3$, a binder content of 21% by weight and a thermal conductivity of 0.019 W/mK at 23° C. was obtained.

Example 5

25 g of a 1% strength by weight aqueous suspension of magnesium montmorillonite (Bentone® LT) were added, while stirring, to 44 g of an aqueous polyurethane emulsion having a polymer content of 27% by weight (Paradur® ZK 42 6486 from BASF Lacke und Farben AG). 7 g of a powder of hydrophobic silica aerogel having a mean diameter of 0.12 mm were then introduced. Thereafter, 37 g of silica aerogel beads which had been rendered hydrophobic and had a mean diameter of 3 mm and a bulk density of 120 g/l were added to this mixture and thoroughly mixed. The readily brushable mixture was introduced into a circular mold having a diameter of 10 cm and bordered at both end faces by filter and sieve sheets placed one on top of the other. The Upper end face was loaded with 2.5 kg, and the material pressed in this manner was predried for 8 hours at 90° C. in a drying oven and additionally dried for 2 hours at 130° C. A stable molding having a density of 167 kg/m$^3$, a binder content of 22% by weight and a thermal conductivity of 0.017 W/mK at 23° C. was obtained.

Example 6

20 g of a 1% strength by weight aqueous suspension of magnesium montmorillonite (Bentone® LT) were added, while stirring, to 30 g of an aqueous polymer emulsion based on thermoplastic styrene/butyl acrylate copolymers having a polymer content of 50% by weight (Acronal® 290 D from BASF Aktiengesellschaft). 176 g of silica aerogel beads which had been rendered hydrophobic, had a mean diameter of 2.6 mm and a bulk density of 115 g/l and had been homogeneously opacified with 7% by weight, based on the beads, of pigment black were added to this mixture. The readily brushable mixture was introduced into a circular mold having a diameter of 10 cm and bordered at both end faces by filter and sieve sheets placed one on top of the other. The upper end face was loaded with 2.5 kg, and the material pressed in this manner was predried for 12 hours at 100° C. in a drying oven and additionally dried for 2 hours at 130° C. A stable molding having a density of 188 kg/m$^3$, a binder content of 26% by weight and a thermal conductivity of 0.019 W/mK at 23° C. was obtained.

Example 7

20 g of epoxy resin powder (Technikoll® KR 2021 from Baiersdorf AG, Hamburg; milled to a mean particle size of 67 μm) were mixed into 60 g of a 1% strength by weight aqueous suspension of magnesium montmorillonite (Bentone® LT). 7 g of a powder of hydrophobic silica aerogel having a mean diameter of 0.08 mm and then 37 g of silica aerogel beads which had been rendered hydrophobic and had a mean diameter of 2.6 mm and a bulk density of 115 g/l were added to this. The powder and beads had each been homogeneously opacified with 7% by weight, based on powder or beads, of pigment black. The brushable material was introduced into a circular mold having a diameter of 10 cm and bordered at both end faces by filter and sieve sheets placed one on top of the other. The upper end face was loaded with 2.5 kg, and the material pressed in this manner was heated for 8 hours at 130° C. and for 1 hour at 200° C. in a nitrogen atmosphere. A stable molding having a density of 186 kg/m$^3$, a binder content of 32% by weight and a thermal conductivity of 0.021 W/mK at 23° C. was obtained.

Example 8

20 g of bismaleimide resin (Palimid® S 410 KR from BASF Aktiengesellschaft) were mixed into 60 g of a 1% strength by weight aqueous suspension of magnesium montmorillonite (Bentone® LT). 7 g of a powder of hydrophobic silica aerogel having a mean diameter of 0.08 mm and then 37 g of silica aerogel beads which had been rendered hydrophobic and had a mean diameter of 2.6 mm and a bulk density of 115 g/l were added to this. The powder and beads had each been homogeneously opacified with 7% by weight, based on powder or beads, of pigment black. The readily brushable mixture was introduced into a circular mold having a diameter of 10 cm and bordered at both end faces by filter and sieve sheets placed one on top of the other. It was loaded with 2.5 kg, and the material pressed in this manner was heated for 6 hours at 130° C. and for 2 hours at 240° C. in a nitrogen atmosphere. A stable molding having a density of 183 kg/m$^3$, a binder content of 32% by weight and a thermal conductivity of 0.019 W/mK at 23° C. was obtained.

Example 9

20 g of silicone rubber (Silopren® LSR 2530 A and B from BAYER AG, mixed in a ratio of 1:1 and combined with 2% by weight of the adhesion promoter Baysilone® oil MH 15 from BAYER AG) were mixed into 60 g of a 1% strength by weight aqueous suspension of magnesium montmorillonite (Bentone® LT). 7 g of a powder of hydrophobic silica aerogel having a mean diameter of 0.08 mm and then 37 g of silica aerogel beads which had been rendered hydrophobic and had a mean diameter of 2.6 mm and a bulk density of 115 g/l were added to this. The powder and beads had been homogeneously opacified with 7% by weight, based on powder or beads, of pigment black. The readily brushable material was introduced into a circular mold having a diameter of 10 cm and bordered at both end faces by filter and sieve sheets placed one on top of the other. The upper end face was loaded with 2.5 kg, and the material pressed in this manner was heated for 6 hours at 130° C. and for 2 hours at 200° C. in a nitrogen atmosphere. A stable molding having a density of 170 kg/m$^3$, a binder content of 32% by weight and a thermal conductivity of 0.023 W/mK at 23° C. was obtained.

Example 10

262 g of a 4% strength by weight aqueous suspension of magnesium montmorillonite (Bentone® LT) were added, while stirring, to 16 g of an aqueous polymer emulsion based on thermoplastic styrene/butyl acrylate copolymers having a polymer content of 50% by weight (Acronal® 290 D from BASF Aktiengesellschaft). 120 g of a powder of hydrophobic silica aerogel having a mean particle diameter of 0.12 mm were then introduced. The brushable material was introduced into a mold having a base area of 15×15 cm$^2$ and bordered at both end faces by perforated polypropylene films and metal sieves. The upper end face was loaded with 7.5 kg, and the material pressed in this manner was dried in a drying oven for 12 hours at 80° C. and for a further 4 hours at 120° C. A stable molding having a density of 149 kg/m$^3$, a binder content of 13% by weight and a thermal conductivity of 0.019 W/mK at 23° C. was obtained.

Example 11

20 g of an inorganic binder based on ceramic fibers of the type Hesiflex® IV from Albert Hellhake GmbH & Co, Dortmund), were stirred into 75 g of a 4% strength by weight aqueous suspension of magnesium montmorillonite (Bentone® LT). 120 g of hydrophobic silica aerogel beads which had been homogeneously opacified with pigment black and had a mean diameter of 2.6 mm and a bulk density of 115 g/l were added to this. The readily brushable material obtained after thorough mixing was introduced into a mold having a base area of 15×15 cm$^2$ and bordered at both end faces by perforated polyfluoroethylene films and metal sieves. The material was dried in a drying oven for 12 hours at 90° C. and for a further 3 hours at 120° C. A stable molding having a density of 149 kg/m$^3$, a binder content of 13% by weight and a thermal conductivity of 0.019 W/mK at 23° C. was obtained.

Example 12

20 g of an inorganic binder containing ceramic fibers of the type Hesiflex® IV were stirred into 90 g of a 1% strength by weight aqueous suspension of magnesium montmorillonite (Bentone® LT). First 7 g of a powder of hydrophobic silica aerogel having a mean particle diameter of 0.12 mm and then 37 g of silica aerogel beads which had been rendered hydrophobic and had a mean diameter of 3 mm and a bulk density of 120 g/l were added to this. The brushable material obtained after thorough mixing was introduced into a circular mold having a diameter of 10 cm and bordered at both end faces by filter and sieve sheets placed one on top of the other. The upper end face was loaded with 2.5 kg, and the material pressed in this manner was dried for 15 hours at 90° C. and for a further 2 hours at 130° C. A stable molding having a density of 162 kg/m$^3$, a binder content of 23% by weight and a thermal conductivity of 0.02 W/mK at 23° C. was obtained.

The examples show that, by adding sheet silicates and/or clay minerals, it is possible to prepare moldings based on silica aerogel which have very low thermal conductivities (less than 0.025 W/mK) in combination with densities of less than 200 kg/m$^3$ and are mechanically stable.

We claim:

1. A molding comprising:
   a) silica aerogel particles which have a mean diameter $d_m$ of from 0.001 to 8 mm;
   b) a binder selected from the group consisting of an organic binder, an inorganic binder and a mixture thereof; and
   c) sheet silicates,
   wherein said molding has a density of from 0.1 to 0.4 g/cm$^3$.

2. The molding of claim 1, wherein said silica aerogel particles are rendered hydrophobic by supercritical drying of a gel liquid of dry methanol or dry isopropanol.

3. The molding of claim 10, wherein said silica aerogel particles are rendered hydrophobic by supercritical drying of a gel liquid of dry isopropanol.

4. The molding of claim 1, wherein said sheet silicates are selected from the group consisting of montmorillonites, kaolinites, attapulgites and a mixture thereof.

5. The molding of claim 1, wherein said binder is an organic binder selected from the group consisting of an epoxy resin adhesive, a reactive polyurethane adhesive, phenol/formaldehyde, resorcinol/formaldehyde, urea/formaldehyde, melamine/formaldehyde resin, silicone resin adhesive, polyimine, polybenzimidazole resin, ethylene/vinyl acetate copolymer, polyamides, styrene/butadiene and styrene/acrylate copolymer.

6. The molding of claim 1, which contains at least 50% by volume of silica aerogel particles having a diameter d of from 0.5 to 8 mm.

7. The molding of claim 6 which contains at least 50% by volume of silica aerogel particles having a diameter d of from 1 to 5 mm.

8. The molding of claim 1, which contains from 2 to 50% by weight, based on silica aerogel particles having a mean diameter $d_m$ of from 0.001 to 8 mm, of silica aerogel particles having a diameter d of from 0.001 to 0.5 mm.

9. The molding as claimed in any of claims 1 or 6, wherein the sheet silicates are montmorillonites.

10. The molding as claimed in any of claims 1 or 6, which contains sheet silicates or clay minerals in an amount of from 0.5 to 10% by weight based on silica aerogel particles having a mean diameter of from 0.001 to 8 mm.

11. The molding as claimed in any of claims 1 or 6, which contains an organic binder.

12. The molding as claimed in any of claims 1 or 6 wherein the silica aerogel particles are hydrophobic.

13. A process for the preparation of a molding comprising:
   a) silica aerogel particles which have a mean diameter $d_m$ of from 0.001 to 8 mm;
   b) a binder selected from the group consisting of an organic binder, an inorganic binder and a mixture thereof; and
   c) sheet silicates,
   wherein said molding has a density of from 0.1 to 0.4 g/cm$^3$ comprising the steps of:

coating or mixing said silica aerogel particles with an aqueous suspension which comprises said sheet silicates and said binder; and curing said coated or mixed silica aerogel particles in a mold.

14. A process as claimed in claim 13, wherein the inner surfaces of the mold are rendered moisture-permeable or hydrophobic.

* * * * *